United States Patent [19]

Forch et al.

[11] 4,194,748
[45] Mar. 25, 1980

[54] RADIAL SHAFT SEALING RING

[75] Inventors: Hans Forch, Birkenau; Helmut Niklas, Weinheim an der Bergstrasse, both of Fed. Rep. of Germany

[73] Assignee: Firma Carl Freudenberg, Weinheim, Fed. Rep. of Germany

[21] Appl. No.: 885,055

[22] Filed: Mar. 9, 1978

Related U.S. Application Data

[63] Continuation of Ser. No. 760,217, Jan. 17, 1977, abandoned.

[30] Foreign Application Priority Data

Jan. 27, 1976 [DE] Fed. Rep. of Germany ... 7602075[U]

[51] Int. Cl.² .............................................. F16J 15/32
[52] U.S. Cl. .................................... 277/152; 277/165; 277/DIG. 6; 277/134
[58] Field of Search ............... 277/DIG. 6, 134, 152, 277/164, 165, 189; 425/DIG. 47, DIG. 242

[56] References Cited

U.S. PATENT DOCUMENTS

| 2,560,557 | 7/1951 | Curtis | 277/152 |
| 2,606,779 | 8/1952 | Jagger | 277/134 |
| 3,561,770 | 2/1971 | Corsi et al. | 277/134 X |
| 3,938,813 | 2/1976 | Forch | 277/152 |
| 3,980,309 | 9/1976 | Dechavanne | 277/165 X |
| 4,015,818 | 4/1977 | Tawakol | 277/164 X |

FOREIGN PATENT DOCUMENTS

| 277781 | 6/1963 | Australia | 277/DIG. 6 |
| 2444502 | 1/1976 | Fed. Rep. of Germany | 277/DIG. 6 |
| 7437 | of 1837 | United Kingdom | 277/152 |
| 657965 | 10/1951 | United Kingdom | 277/134 |
| 657966 | 10/1951 | United Kingdom | 277/134 |

Primary Examiner—Robert S. Ward, Jr.
Attorney, Agent, or Firm—Sprung, Felfe, Horn, Lynch & Kramer

[57] ABSTRACT

In a sealed radial shaft assembly comprising a radial shaft and an annular sealing ring, the inside of said ring encircling said shaft, said sealing ring having fiber ends projecting therefrom and contacting said shaft so as to enhance said seal, the improvement which comprises an integrally molded casing about the outside of said ring. The casing may be molded of thermoplastic or thermosetting materials, e.g. polypropylene, polyurethane, or the like, and a stiffening reinforcement such as a metal ring may be embedded in the casing. If the ring portion is of fabric, the plastic fills the pores to form a unit therewith.

16 Claims, 2 Drawing Figures

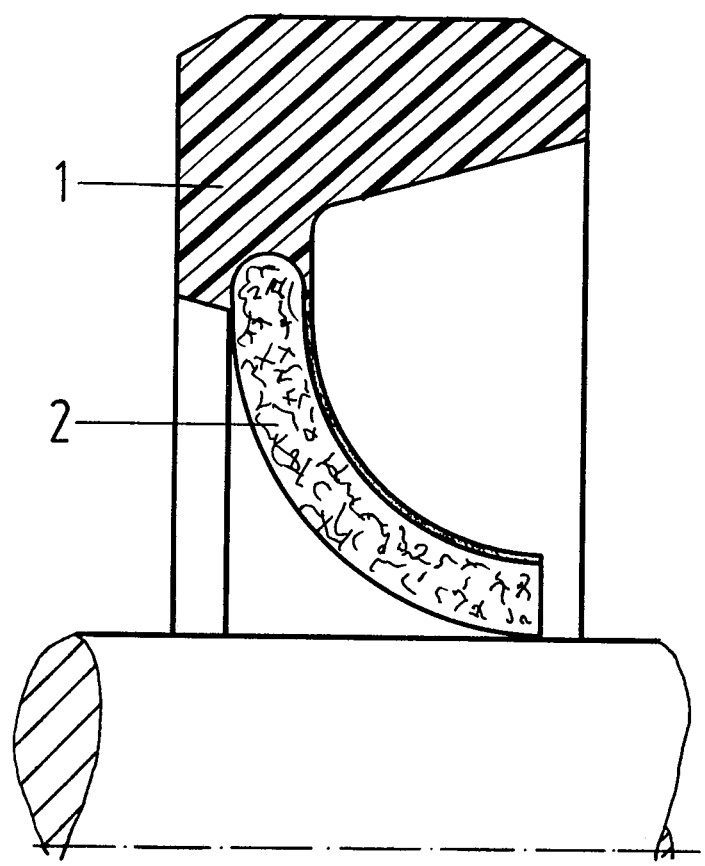
FIG.I

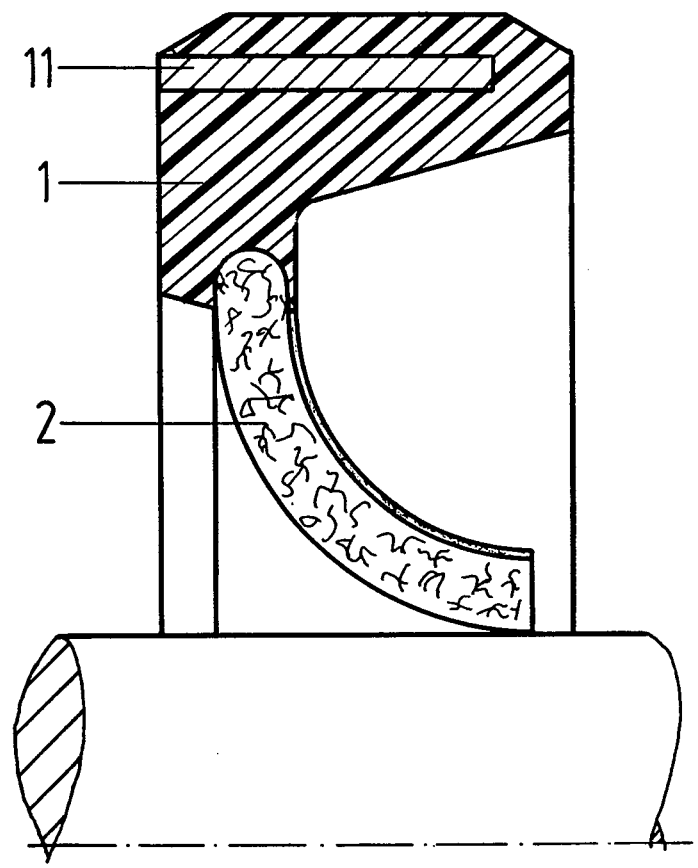
FIG. II

RADIAL SHAFT SEALING RING

This is a continuation of application Ser. No. 760,217, filed Jan. 17, 1977, now abandoned.

BACKGROUND

The invention relates to a radial shaft sealing ring consisting of a casing and a flexible sealing ring disposed therein, from whose bearing surface fibers project.

For many different reasons, measures must be taken to seal the passage of shafts through bores in housings. In accordance with the many different applications, a correspondingly great number of types of construction have been developed, each suitable for a more or less broad range of applications.

Radial shaft sealing rings consist ordinarily of a stiff component of metal and an elastomeric part directly joined thereto. The elastomeric part has an especially shaped sealing lip which wipingly and hence sealingly engages the periphery of the shaft that is to be sealed.

Recently a construction has become known through German "Auslegeschrift" No. 2,339,353, in which the elastomeric part has been replaced by a structure contacting the shaft axially and having fiber ends projecting from the surface thereof facing the shaft. Seals of this kind have proven to be very resistant to mechanical damage, and they have shown good characteristics with regard to their sealing function. On account of the expensive process used in making them, however, these seals have not yet achieved any appreciable popularity.

The process of making these seals is essentially concerned with the problem of anchoring the fiber sealing element in the mounting. For the achievement of a sufficiently tight and mechanically strong attachment, the use of metal clamping rings has been unavoidable in many cases.

The direct molding of a fiber-containing elastomer onto a simple metal ring by a method similar to the method of manufacturing lip-type sealing rings is possible under certain conditions. In such a procedure, however, all that is accomplished by the embedded fibers is a reduction of wear, and the sealing action does not match that of the one specified in German "Auslegeschrift" No. 2,339,353.

THE INVENTION

The invention is addressed to the problem of developing a radial shaft sealing ring which will provide the versatility of the sealing element of German "Auslegeschrift" No. 2,339,353, while being as simple to manufacture as the lip-type sealing rings of the prior art.

This problem is solved in accordance with the invention by a radial shaft sealing ring consisting of a casing and a flexible sealing ring disposed therein, from whose shaft-contacting surface fibers project, characterized in that the casing consists of plastic, a thermoplastic, a thermosetting plastic, or polyurethane, and is molded directly and integrally on the seal.

In a special embodiment, the casing furthermore contains a strengthening insert in the form of a metal ring. In still another embodiment, the casing consists of polypropylene.

Exemplary embodiments of the radial shaft sealing ring of the invention are represented in the drawings wherein:

FIG. I is a cross-sectional representation of one half of a radial shaft sealing ring of the invention; and FIG. II is a similar view of another embodiment.

Referring now more particularly to the drawings, in FIG. I there is shown a ring consisting of a sealing element of any kind specified in German "Auslegeschrift" No. 2,339,353, on which a casing 1 of plastic is directly formed.

The fiber-containing sealing part is stamped out of a continuous ribbon of appropriate material in the form of circular blanks. In an injection molding die, the center portion of these blanks, which later will perform the sealing function, is masked, while its outer margin extends into the cavity of the die. After the die is closed, the cavity is injected full of a thermoplastic or thermosetting plastic, such as polypropylene, for example, thereby forming the casing of the radial shaft sealing ring.

This results in an intimate anchoring of the sealing element in the casing. If unwoven or woven fabrics are used as the sealing part, their pores will be filled completely by the plastic of the casing after the injection molding process.

FIG. II shows a corresponding radial shaft sealing ring whose casing is strengthened by a supporting ring 11 of metal or of a different kind of plastic. Such rings are inserted into the mold or die and encased together with the sealing part.

The use of such reinforcements can be advantageous especially in the case of relatively large sizes, when it is anticipated that the rings will be driven into the accommodating recess in the housing by means of simple hammering tools. The particular construction and arrangement of the reinforcements in or on the sealing casing 1 is determined on the basis of practical considerations.

The special advantage of the sealing element of the invention is to be seen in the fact that it is substantially cheaper to make than any other similar, known seals having comparable properties.

It will be appreciated that the instant specification and examples are set forth by way of illustration and not limitation, and that various modifications and changes may be made without departing from the spirit and scope of the present invention.

What is claimed is:

1. In a sealed radial shaft assembly comprising a radial shaft and a flat flexible annular sealing ring, the inner portion of said ring encircling said shaft, said sealing ring having fiber ends projecting therefrom and contacting said shaft so as to enhance said seal, the improvement which comprises an integral casing molded on the outside of said ring with the outer portion of the ring embedded in the casing to maintain the inner portion of the ring in contact with the shaft in an axially deflected position whereby the flexibility of the ring permits flexible sealing of the shaft independent of mounting tolerances.

2. An assembly according to claim 1, wherein said casing comprises plastic.

3. An assembly according to claim 1, wherein said casing comprises polypropylene.

4. An assembly according to claim 1, wherein said casing comprises polyurethane.

5. An assembly according to claim 1, wherein said casing includes a reinforcement embedded therein.

6. An assembly according to claim 5, wherein said reinforcement comprises a metal ring.

7. An assembly according to claim 6, wherein said ring comprises a fabric, the material of said casing extending into said fabric.

8. An assembly according to claim 1, wherein the sealing ring comprises one of a woven and nonwoven fabric and the casing is injection molded thereon filling the pores thereof.

9. A sealing ring for a radial shaft comprising a disklike flat flexible annulus having fibers projecting from at least one face thereof and an integral peripheral casing molded directly on the outer periphery of said annulus with a portion of the outer periphery embeddded in the casing to maintain the inner portion of the annulus in contact with the shaft in an axially deflected position whereby the flexibility of the ring permits flexible sealing of the shaft independent of mounting tolerances.

10. A ring according to claim 9, wherein said casing comprises plastic.

11. A ring according to claim 9, wherein said casing comprises polypropylene.

12. A ring according to claim 9, wherein said casing comprises polyurethane.

13. A ring according to claim 9, wherein said casing includes a reinforcement embedded therein.

14. A ring according to claim 13, wherein said reinforcement comprises a metal ring.

15. A ring according to claim 13, wherein said ring comprises a fabric, the material of said casing extending into said fabric.

16. A ring according to claim 9, wherein the annulus comprises one of a woven and nonwoven fabric and the casing is injection molded thereon filling the pores thereof.

* * * * *